ADJUSTABLE VOLTAGE SUPPLIES

Filed June 18, 1954 2 Sheets-Sheet 1

INVENTOR.
JOSEPH O. PREISIG
BY
[signature]
ATTORNEY

ADJUSTABLE VOLTAGE SUPPLIES

Filed June 18, 1954 2 Sheets-Sheet 2

INVENTOR.
JOSEPH O. PREISIG
BY [signature]
ATTORNEY

United States Patent Office
2,879,447
Patented Mar. 24, 1959

2,879,447

ADJUSTABLE VOLTAGE SUPPLIES

Joseph O. Preisig, Trenton, N.J., assignor to Radio Corporation of America, a corporation of Delaware Application June 18, 1954, Serial No. 440,819
5 Claims. (Cl. 315—22)

This invention relates generally to voltage supplies and more particularly to adjustable voltage supplies of the type suitable for use in satisfying the adjustable focus voltage requirements of a cathode ray tube.

In a cathode ray tube, beam focusing may be effected electromagnetically or electrostatically. Electrostatic focusing is quite generally practiced in color kinescopes of the types presently contemplated. The focus voltage requirements for a typical tri-color kinescope, such as one of the general type described in the article by H. B. Law entitled, "A Three-Gun Shadow-Mask Kinescope," appearing in the October 1951 issue of the Proceedings of the I. R. E., are significantly more demanding than those of an electrostatically focused monochrome kinescope. To satisfy the focus voltage and current requirements of a color kinescope with the requisite regulation and without excessive power losses requires improvement over the performance of the usual type of focus voltage supply heretofore used for monochrome kinescopes of the electrostatic focus type. It is a conventional practice to develop a focus voltage for an electrostatically focused kinescope via rectification of the high amplitude transient voltage pulses appearing in the kinescope's associated horizontal deflection wave output transformer during retrace periods of the line scanning cycle, when cutoff of the horizontal output tube causes a sudden collapse of the magnetic field of the horizontal deflection yoke. The usual focus voltage supply of this type simply involves tapping the horizontal output transformer at a point of suitable flyback pulse potential, connecting a diode and a charge capacitor between the tap and a point of reference potential, shunting a bleeder resistance across the D.-C. output of the rectifying diode, and adjustably tapping the bleeder resistance to derive the variable focus voltage.

In accordance with the present invention a novel and improved adjustable voltage supply is provided, which may satisfactorily serve as the variable focus supply for a color kinescope, with improved regulation and lowered power consumption over any practical embodiment of the simple bleeder type supply above described designed to serve a similar purpose. In accordtnce with the invention, such results are achieved by utilizing control of the charging current of the charging capacitor in the focus rectifier circuit to obtain the desired variations in output voltage. In accordance with one embodiment of the present invention such charging current control is simply obtained by varying the amount of resistance in series with the rectifying diode and the charging capacitor. In accordance with other embodiments of the present invention, such a manner of control is augmented by simultaneously adjusting the amplitude of a pulse component applied to the rectifying diode in bucking relationship to the source flyback pulse voltage. In accordance with a particular one of these latter embodiments of the present invention the bucking voltage thus applied may include a component derived from the regulated ultor voltage supply, whereby to aid in maintaining a desired focus-ultor voltage ratio.

Thus, it is a primary object of the present invention to provide a novel and improved adjustable voltage supply.

It is a further object of the present invention to provide a novel and improved voltage supply which may serve as the variable focus supply for a cathode ray tube with an optimum relationship between regulation attained and power consumed.

It is an additional object of the present invention to provide a color television receiver with a novel and improved adjustable focus supply.

It is also an object of the present invention to provide a color kinescope with a novel and improved variable focus supply, having satisfactory regulation, and minimized power losses.

A further object of the present invention is to provide a color kinescope high voltage supply with improved means for varying focus voltage, and with improved tracking between supply, focus and ultor voltages.

Other objects and advantages of the present invention will be recognized by those skilled in the art after a reading of the following detailed description and an inspection of the accompanying drawings in which.

Figure 1:
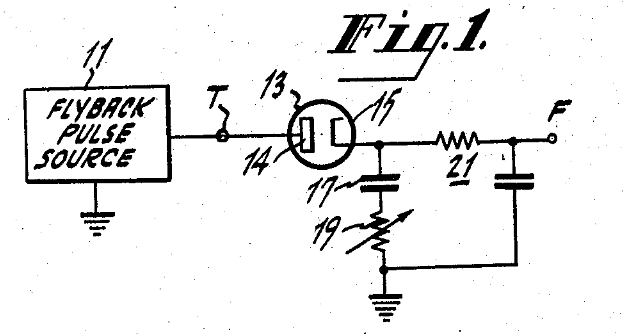
Figures 1, 2 and 3 illustrate adjustable voltage supplies in accordance with various embodiments of the present invention.

Referring to Figure 1 in greater detail an adjustable voltage supply is illustrated embodying principles of the present invention. A flyback pulse source 11, illustrated as having an output terminal "T," is shown as the energy source for the novel variable supply. While circuit details of the flyback pulse source 11 are not shown in this figure for sake of simplicity, the flyback pulse source 11 may, for example, comprise the horizontal deflection wave output system of a television receiver, such a system including a deflection wave output transformer, the output terminal "T" being at a suitable tapping point on the output transformer windings.

A rectifier, diode 13, has its anode 14 connected to terminal "T," and its cathode 15 returned via a charging capacitor 17 to a point of reference potential (i.e. ground in the illustrative embodiment). The D.-C. output appearing at cathode 15 is applied via an R-C smoothing filter 21 to the supply output terminal "F."

The novel manner of varying the amplitude of the D.-C. supply voltage available at terminal "F" is embodied in the provision of a variable resistor 19 in series with the diode 13 and the charging capacitor 17. As illustrated, the variable resistor 19 is coupled between the capacitor 17 and ground. By varying the magnitude of the series resistor 19, the amplitude of the charging current supplied by diode 13 to charge capacitor 17 in response to the appearance of flyback pulses at terminal "T" is varied to control the D.-C. potential developed at cathode 15 and applied to the supply output terminal "F."

Figure 2:
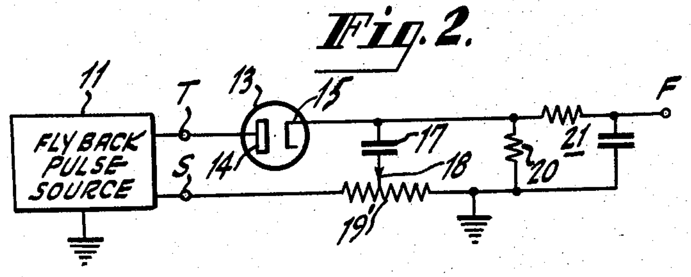

Another form of the invention is illustrated in Figure 2. Again, the rectifying diode 13 has its anode 14 coupled to the output terminal "T" of the flyback pulse source 11, and its cathode 15 returned to ground via a charging capacitor 17. Filter 21 is again included in the coupling between cathode 15 and the supply output terminal "F" to perform the conventional smoothing function. A controllable amount of resistance is again included in the charging circuit of capacitor 17. However, in contrast to the simple use of a variable series resistor 19 as shown in Figure 1, such charging resistance variation is obtained by varying the position of an adjustable tap 18, to which capacitor 17 is connected, on a potentiometer 19′, one end of which is connected to ground. Adjustment of the position of tap 18, it will be readily appreciated varies the resistance portion of potentiometer 19′ that is inserted in the capacitor charging circuit, and thus provides a charging current control similar to that of the embodiment of Figure 1.

However, the adjustment of the position of tap 18 of potentiometer 19′ has a further controlling effect upon the amplitude of the capacitor charging current apart from this variation of charging resistance, which may be explained as follows. The non-grounded end of potentiometer 19′ is illustrated as being connected to an output terminal "S" of the flyback pulse source 11. The output terminal "S" may be considered as a source of flyback pulses of reduced amplitude relative to those appearing at output terminal "T," and the output terminal "S" may thus, for example, be simply a lower potential tapping point on the aforementioned deflection wave output transformer. It will thus be appreciated that, with the indicated connections for the fixed terminals of the potentiometer 19′, the adjustment of the position of tap 18 varies the amplitude of a flyback pulse component applied via capacitor 17 to the cathode 15. The cathode-applied pulse is of the same polarity as the flyback pulse applied from terminal "T" to anode 14, and thus effectively bucks out a portion of the source pulse from which the illustrated supply derives its D.-C. output. Therefore, it may be appreciated that control of the capacitor charging current to vary the D.-C. output supplied at terminal "F" is achieved via two simultaneous effects by varying the position of tap 18 on potentiometer 19′. That is, variation of the amplitude of a bucking pulse which effectively reduces the source pulse amplitude, as well as variation of the resistance in the capacitor charging circuit accompanies such tap position variation. It may be appreciated that with these dual control effects, the attainable control range is significantly increased over that of the embodiment illustrated in Figure 1 without significant change in power consumption or attainable degree of regulation.

A fixed load resistor 20 has also been illustrated in the embodiment of Figure 2 as connected between the cathode 15 and ground. While such a load resistor is not essential to the operation of the illustrated embodiment and may be omitted, its inclusion serves to improve the regulation of the supply and also has a control range increasing effect.

Figure 3:
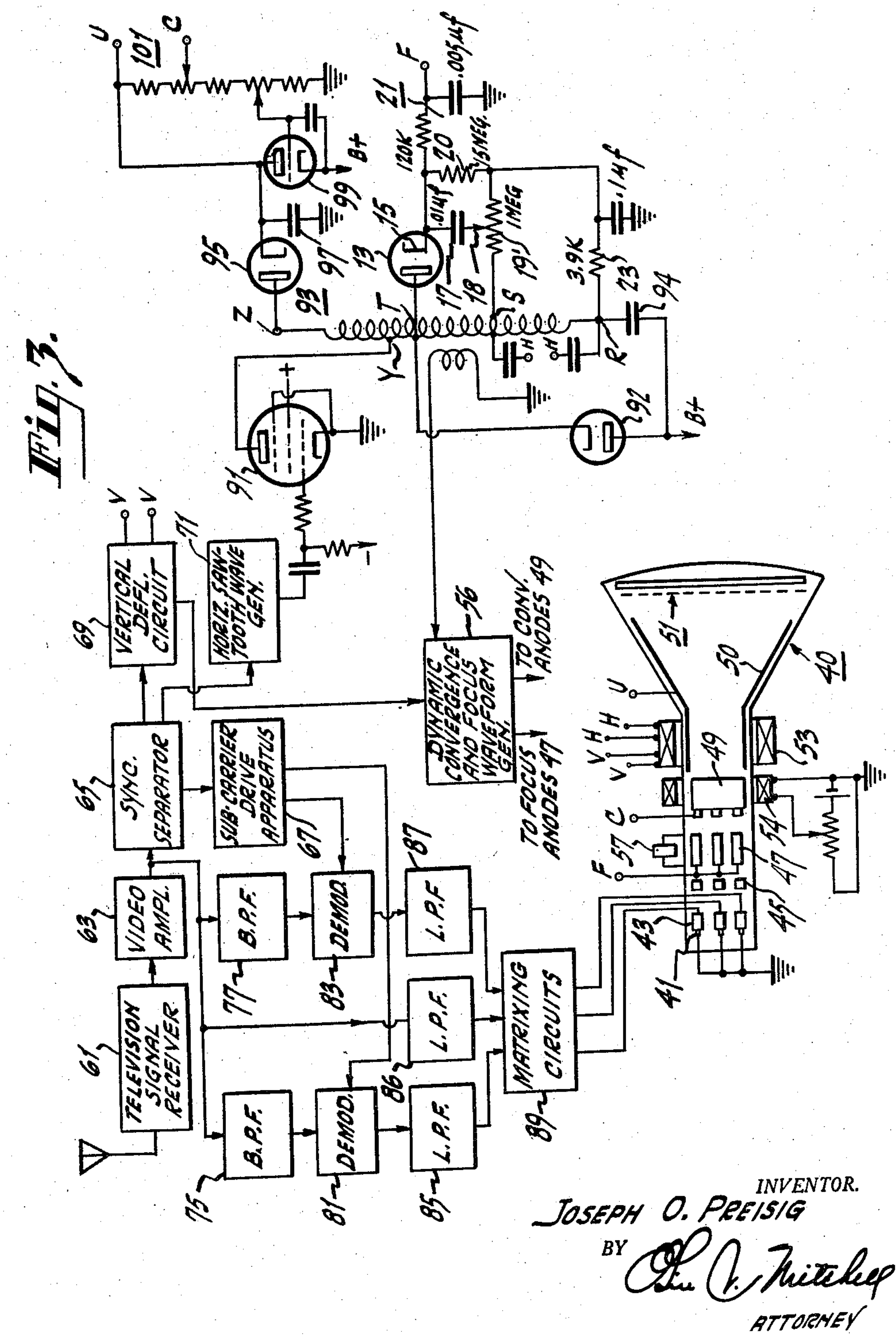

In Figure 3, a high voltage supply, incorporating a voltage supply embodying the principles of the present invention as the variable focus voltage supply, has been illustrated schematically in the setting of a color television receiver.

The illustrated receiver is generally representative of presently contemplated color receivers for a simultaneous subcarrier type color television system in accordance with the revised FCC color standards, and is in general accord with the principles and apparatus discussed in the article entitled "Principles and Development of Color Television Systems," by G. H. Brown and D. G. C. Luck appearing in the June 1953 issue of the RCA Review. Carrier waves modulated by a composite color picture signal are illustrated as being received by conventional signal receiving apparatus 61, which may include the usual RF tuner, converting apparatus, IF amplifier, signal detector, etc. The video frequency signals recovered from the modulated carrier in the receiving apparatus 61 are amplified in the video amplifier 63. Synchronizing information is derived from the recovered signals in the sync separator 65 and utilized to synchronously control the receiver's subcarrier drive apparatus 67, to control the generation of vertical scanning waves in the vertical deflection circuits 69, and control the generation of horizontal frequency sawtooth voltage waves in the horizontal sawtooth wave generator 71.

Respective color mixture signals (e.g. narrow band $E_Q$ signals and wider band $E_I$ signals, discussed in detail in the aforementioned article) are recovered from the video signal output of amplifier 63 in respective color demodulator channels which include bandpass filters 75 and 77 of respectively appropriate passbands, synchronous demodulators 81 and 83 receiving respectively appropriate phases of the output of the subcarrier drive apparatus 67, and low pass filters 85 and 87 having the respectively appropriate narrow and wider responses. The receiver is also provided with a brightness channel, including a low pass filter 86 having the desired wide band response, through which the broad band monochrome portion of the composite picture signal may pass. The outputs of the brightness channel and two color channels are suitably combined in the matrixing circuits 89 of the receiver to obtain the simultaneous color signals which may be applied to appropriate beam control elements of the color image reproducer 40.

The color image reproducer 40 is illustrated schematically as one of the three-gun, shadow-mask kinescope type. Color image reproducers of this general type are discussed in some detail in the article by H. B. Law entitled, "A Three-Gun Shadow-Mask Kinescope," appearing in the October 1951 issue of the Proceedings of the I.R.E. In a color image reproducer of this type, three electron beams are used, one for each primary color. The beams strike a phosphor screen composed of a regular array of red-, green-, and blue-emitting phosphor dots. Between the electron gun position and the phosphor screen there is placed a thin perforated metal sheet for the purpose of partially masking the electron beams. The phosphor dot array on the screen comprises a plurality of closely spaced phosphor dot trios, each trio consisting of a red-, green-, and blue-emitting phosphor dot with the centers of the dots lying at the corners of an equilateral triangle. The trios themselves lie at the corners of an equilateral triangle of larger size. Associated with each of the phosphor dot trios is a hole in the video mask, these holes also being located at the corners of an equilateral triangle. The three beams, disposed 120° apart about the tube axis, are converged to a point on the mask by suitable static and dynamic beam converging means. The electron beam which is to contribute the red portion of the picture is prevented, by the mask, from striking those areas on the screen containing blue and green emitting phosphors. Likewise the green and blue beams can strike only the green and blue emitting phosphor dots, respectively. The target structure 51 of the illustrative color kinescope 40 may be considered to be of the general shadow-mask type above described.

As schematically illustrated the three electron beams are developed and shaped in respective electron gun structures, each including a thermionic cathode 41, a control grid 43, a first anode or accelerating electrode 45, and a focusing electrode 47. The electron gun structures may be disposed symmetrically about the tube axis such as to produce three substantially parallel beams, or may be inclined at respective angles to the tube axis so as to provide three beams substantially converging at a common point on the target.

A common convergence anode 49 is illustrated, which when energized by suitable dynamic convergence waveforms generated in the beam convergence circuits 56 along with an appropriate (static convergence) D.-C. component, serves to converge the three beams to a common point in the plane of the shadow-mask of target structure 51 throughout the scanning of the raster. The principles of multibeam convergence, and a description of typical circuits for developing dynamic convergence waveforms from sawtooth waves of field and line frequency may be found in an article by Albert W. Friend appearing in the October 1951 issue of the Proceedings of the I. R. E. and entitled "Deflection and Convergence in Color Kinescopes." As illustrated, the beam convergence circuits may derive the respective sawtooth information from the vertical deflection circuits 19 and the horizontal output transformer 93, and convert these sawtooth waves into essentially parabolic waveforms, as disclosed in the aforementioned Friend article, for combined application with a D.-C. component as suitable convergence waveforms to the common convergence electrode 49. Also, as indicated in Figure 3, the dynamic convergence waveforms, generated for application to convergence anode 49 by generator 56, may also be applied (suitably modified in amplitude) to the focus electrodes 47 to maintain essentially optimum focus throughout the entire raster, as suggested in the aforementioned Friend article.

While the use of electrostatic convergence apparatus has thus been illustrated, it will be appreciated that electromagnetic convergence apparatus may alternatively be employed.

Three beam alignment magnets 57, one associated with each of the three electron beams may be employed to provide individual correction of beam misalignment, as disclosed in the aforementioned Friend article. However, where electromagnetic convergence apparatus is employed of the nature providing individual control of the three beams in respective radial directions relative to the tube axis a single beam alignment magnet providing control of a selected one of the beams in a direction perpendicular to the radial convergence control direction associated with that beam is sufficient. In such a case the single beam alignment magnet may, for example, take the form of an adjustably insertable magnet associated with cooperating external and internal pole pieces.

In addition to the beam controlling apparatus already described, the illustrated color kinescope 40 is also provided, as is generally customary, with a "color purity" yoke 54, applying a uniform transverse magnetic field to all the electron beams to orient the system of beams as desired. The yoke may comprise either a rotatable single pair of coils, or two fixed pairs of coils at right angles, fed from an adjustable source of D.-C. (as indicated on the drawing). The use of such a "purity coil" to deflect the three beams equally so that they may be adjusted to pass through their respective color centers is explained in greater detail in the aforesaid Friend article.

The kinescope is provided, as is conventional, with a final accelerating electrode, the ultor 50, which may take the usual form of a conductive coating on the inner surface of the kinescope 40 extending from the vicinity of the convergence electrode 49 to the beam target structure 52. Where the flared portion of the kinescope envelope is itself a conducting metal, the conductive coating need only extend forward sufficiently to make electrical contact with the metal flared portion.

To effect deflection of the three beams to trace a scanning raster on the target structure 51, a deflection yoke 53 is provided with appropriately disposed horizontal and vertical deflection windings. The yoke 53 is illustrated as having vertical yoke terminals V—V, to which field frequency scanning waves developed in the vertical deflection circuits 69 are applied. The horizontal yoke terminals H—H derive line frequency scanning waves from the horizontal output transformer 93, energized by a current developed in the horizontal output tube 91 to provide the desired scanning sawtooth in the horizontal yoke. The illustrated horizontal output transformer 93 is of the autotransformer type, the output of the horizontal output tube 91 being applied across a selected portion of the total series of windings, and the horizontal yoke being effectively coupled across a smaller segment of this portion. The driving connection of output tube 91 to the transformer 93 is illustrated as being at an intermediate point "Y," while the yoke connections are illustrated at lower potential terminals "R" and "S" on the transformer 93. The conventional damper tube 92 is illustrated as having its cathode connected to transformer 93 at point "T," intermediate points "S" and "Y," and its anode connected via a B-boost capacitor to the low potential terminal "R." Details of components and circuitry conventionally associated with yoke circuits, such as width and linearity controls, centering circuits, etc. have not been illustrated for the sake of simplifying the drawing.

The receiver's high voltage supply includes a rectifying diode 95, having its anode connected to the high potential terminal "Z" of the horizontal deflection wave output transformer 93 and its cathode connected via capacitor 97 to ground. The supply output terminal "U," to which the kinescope's ultor electrode 50 is connected, is supplied to the high D.-C. potential required for the ultor electrode by means of its connection to the cathode of diode 95. The requisite stability of the supplied ultor voltage is insured by the presence of a shunt regulator tube 99, having its anode connected to the terminal "U," its cathode returned to ground via a B+ supply, and its control grid deriving an error or reference potential from a suitable tapping point on a bleeder 101 shunting the ultor voltage output. As illustrated, the D.-C. convergence voltage required by convergence anode 49 may also be derived from bleeder 101.

A novel focus supply of the type illustrated in Figure 2 is incorporated in the receiver of Figure 3 as follows. The anode 14 of the focus rectifier 13 is connected to a tapping point "T" of appropriate flyback pulse potential on the windings of the output transformer 93. A lower potential tapping point on the windings of transformer 93 serves as the terminal "S" to which one fixed terminal of the potentiometer 19′ is connected. The charging capacitor 17 for the focus rectifier 13 is again connected between the cathode 15 and the variable tap 18 of potentiometer 19′. The load resistor 20 is again connected between the cathode 15 and the other fixed terminal of the potentiometer 19′. In contrast with the circuit of Figure 2, the common junction point between load resistor 20 and potentiometer 19′ is connected to a point of B-boost potential (rather than a point of ground potential). This is effected by means of the connection of a resistor 23 between the common junction point and the terminal "R" of the output transformer 93. The D.-C. potential developed at the cathode 15 of the focus rectifier 13 is smoothed by the filter 21 and applied to the supply output terminal "F," to which the focus electrodes 47 of the color kinescope 40 are coupled. As previously explained with respect to Figure 2, adjustment of the focus voltage supplied to these electrodes is simply effected by varying the position of tap 18 on potentiometer 19′, the charging current for capacitor 17 being controlled thereby through the dual effects of varying the series resistance in the capacitor charging circuit, and varying the amplitude of the bucking pulse applied to cathode 15.

Figure 4:
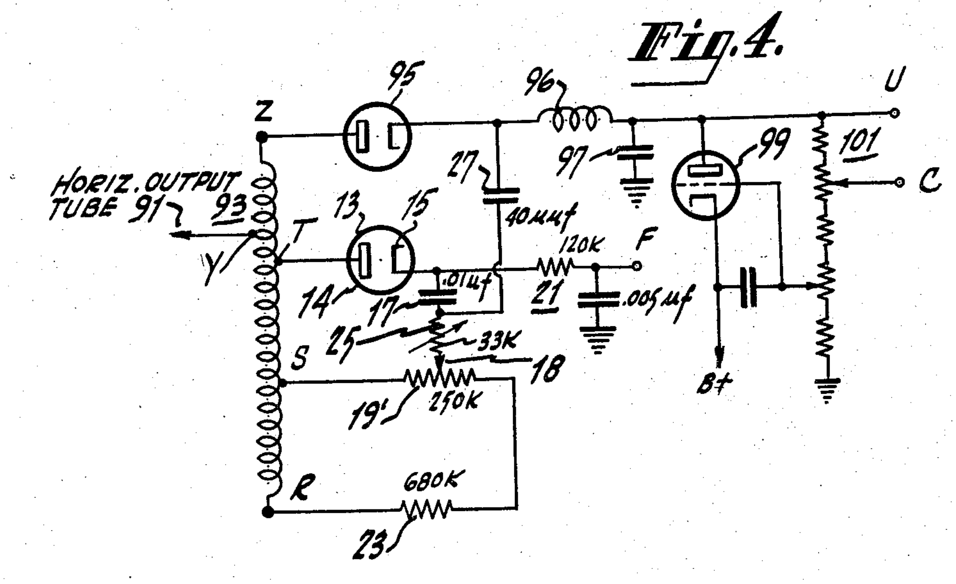
Figure 4 illustrates in block and schematic form a color television receiver, the high voltage supply of which incorporates an embodiment of the present invention.

Figure 4 illustrates a modification of the above described high voltage supply, which may be effected in the color receiver of Figure 3 in accordance with another form of the present invention. While many of the elements shown in Figure 3 are duplicated in the arrangement of Figure 4 and thus are shown with the same reference numerals, the following differences between the two supplies may be noted. An additional variable resistance 25 is connected in series between the charging capacitor 17 and the potentiometer tap 18, this variable resistor providing a further control of the resistance of the charging circuit in the fashion of the embodiment of Figure 1. It may also be noted that the optional load resistor 20 has been omitted from the focus supply of Figure 4.

Also, a capacitor 27 is connected between the cathode of the ultor rectifier 95 and the junction point between capacitor 17 and the added resistor 25. The purpose for this tie-in between the ultor and focus supplies is to aid in maintaining the ratio of focus and ultor voltages constant at a desired value. It may be noted that in the absence of such a connection, a drop in pulse source potential, for example, would be accompanied by a drop in focus voltage, but not a drop in ultor voltage, since the regulating action of tube 99 tends to hold the ultor voltage constant in the face of such a source change by reducing the current drawn by the regulator tube. However, where the tie-in between ultor and focus supply is made as shown in Figure 4, the reduction in regulator current reduces a bucking pulse component supplied to the focus rectifier cathode 15 via capacitor 27, so that a tendency for the developed focus voltage to increase opposes the source-responsive decrease, holding the ratio substantially constant.

There have thus been described novel adjustable voltage supplies which may serve the requirements of a cathode ray tube. There have been particularly described various forms of adjustable focus supplies which are well suited for service in supplying the variable focus voltage required from the high voltage supply of a color receiver by the focus electrodes of a color kinescope. In all of the discussed embodiments, variation of the supplied voltage may be attained by controlling the charging current in the focus rectifier circuit. This control may be effected through simple variation of the series resistance in this charging circuit, but where maximum control range is desired, such charging resistance variation may be accompanied by simultaneous adjustment of the amplitude of a bucking voltage applied to the focus rectifier in addition to the source voltage. Particularly where essentially constant ratio tracking between the ultor and focus voltages supplied to a color kinescope is desired, a portion of this bucking voltage may be made sensitive to variations in the ultor voltage regulator current, so that changes in bucking voltage may follow changes in source voltage to counteract the effect of such source voltage changes on the aforesaid ratio. Focus supplies which accord with the principles of these embodiments of the present invention are believed to provide better regulation with lower power consumption than focus supplies of the conventional bleeder type.

It will be noted that in Figures 3 and 4 specific values of capacitance, resistance, etc. for various circuit elements have been shown on the drawing. It will be appreciated that these values are given by way of example only, and the invention should in no way be considered as limited to the use of elements of such values.

Among the particular advantages of a focus supply in accordance with the present invention, in contrast with the conventional bleeder type supply, which may be noted, is the saving in voltage rating and resultant insulation requirements for the focus control resistor or potentiometer. In the conventional simple bleeder type supply, the bleeder must be designed to withstand the maximum focus voltage, i.e. the full focus voltage appears across the bleeder. However, in a focus supply in accordance with the various embodiments of the present invention discussed previously, the control resistor 19 or the control potentiometer 19′ need only withstand a voltage corresponding to the width of the desired focus control range, i.e. only a voltage corresponding to the width of the control range appears across the control element 19 or 19′. In addition to savings in power consumption as a result thereof, the accompanying reduction in insulation requirements for the control element is a significant economic advantage.

It may also be noted that the voltage appearing across the control resistance element in the capacitor charging circuit of the focus supply is proportional to the current demand on the focus supply (the charging current for capacitor 17 necessarily being proportional to the "discharging" current drawn by the focus electrode). The described circuits thus provide a source of control pulses, which may be used directly, or after rectification in a desired polarity, for desired control purposes, such as the control of a focus regulator tube.

It may also be observed that the power consumed in the charging current control element of the described supplies need not be wasted. For example, by replacing the control resistor 19 of the embodiment of Figure 1 with a tightly coupled transformer having a variable resistor load, the same desired control of charging resistance could be obtained, while in addition providing a source of pulses for additional B-boost or for feeding a low voltage rectifier satisfying some other voltage requirements of associated equipment.

Having described my invention, what is claimed is:

1. In a color television receiver comprising a color kinescope including a focus electrode and an ultor electrode, said receiver also including a horizontal deflection wave output transformer, flyback pulses developed in said transformer during periodic retrace periods appearing with successively higher potentials to respective first and second points on said transformer, a high voltage supply comprising in combination a first rectifier having an anode and a cathode, a voltage divider coupled between said first point and a point of reference potential, said voltage divider having an adjustable tap, a capacitor, means for coupling said capacitor between said cathode and said adjustable tap, means for coupling said anode to said second point, a supply output terminal, means for coupling said terminal to said cathode, and means for connecting said focus electrode to said supply output terminal, said high voltage supply also including a second rectifier having an input circuit and an output circuit, means for coupling said second rectifier input circuit to a point on said transformer of higher flyback pulse potential than said first and second points, means for coupling said ultor electrode to said output circuit, a regulator tube shunting said output circuit and responsive to variations in voltage supplied to said ultor electrode, and means for capacitively coupling said second rectifier output circuit to said first rectifier's cathode.

2. Apparatus in accordance with claim 1 wherein said coupling between said capacitor and said adjustable tap includes a variable resistor.

3. In a signalling system provided with a source of periodic voltage pulses, and a regulated voltage supply responsive to the periodic voltage pulses of said source, said regulated voltage supply including a first rectifier having an input circuit coupled to said source and an output circuit, an adjustable voltage supply comprising the combination of a second rectifier having an input electrode and an output electrode, means for applying said periodic voltage pulses to said second rectifier input electrode, a capacitor, means for coupling said capacitor to said second rectifier output electrode such that said second rectifier delivers a charging current to said capacitor in response to the application of said voltage pulses to said second rectifier input electrode, a supply output terminal fixedly connected to the output electrode of said second rectifier, means for adjusting the voltage appearing at said output terminal, said voltage adjusting means comprising means for adjusting the amplitude of the charging current delivered to said capacitor independently of variations, if any, in the periodic voltage pulses applied to said second rectifier input electrode, and means for coupling said first rectifier output circuit to the output electrode of said second rectifier to render the voltage appearing at said supply output terminal substantially insensitive to variations of said periodic voltage pulses.

4. In a color television receiver including a color kinescope comprising first and second electrodes requiring respective, relatively high, operating potentials, said receiver also including a horizontal deflection wave output transformer, flyback pulses developed in said transformer during periodic retrace periods appearing with successively higher potentials at respective first and second points on said transformer, a high voltage supply for supplying said respective, relatively high, operating potentials to said first and second electrodes, said supply comprising in combination a first rectifier having an input circuit and an output circuit, means for coupling said first rectifier input circuit to one of said points on said transformer, means for coupling said first electrode to said output circuit, a regulator tube shunting said output circuit and responsive to variations in the potential supplied to said first electrode, a second rectifier having an input electrode and an output electrode, means for coupling said input electrode to the other of said points on said transformer, a capacitor, means for connecting one side of said capacitor to said output electrode, means for coupling the other side of said capacitor to a point of reference potential, means for coupling said output electrode to said second electrode of said color kinescope, and means for causing the potential supplied to said second electrode by said second rectifier to track with the potential supplied to said first electrode, said last-named means comprising means for coupling said first rectifier output circuit to said other side of said capacitor.

5. In a color television receiver including a color kinescope comprising first and second electrodes requiring respective, relatively high, operating potentials, said receiver also including a horizontal deflection wave output transformer, flyback pulses developed in said transformer during periodic retrace periods appearing with successively higher potentials at respective first and second points on said transformer, a high voltage supply for supplying said respective, relatively high, operating potentials to said first and second electrodes, said supply comprising in combination a first rectifier having an input circuit and an output circuit, means for coupling said first rectifier input circuit to one of said points on said transformer, a coupling between said output circuit and said first electrode of said color kinescope to supply operating potential to said first electrode, an electron discharge device shunting said output circuit, means for varying the current flowing through said shunt electron discharge device in accordance with variations in the potential supplied to said first electrode, a second rectifier, a capacitor, means for charging said capacitor through said rectifier with energy derived from the other of said points on said transformer, means for applying the voltage developed across said capacitor in response to said charging to said second electrode of said color kinescope, and means coupled to said capacitor and sensitive to variations of the current through said electron discharge device for varying said developed voltage by effectively bucking out a portion of said derived energy.

References Cited in the file of this patent

UNITED STATES PATENTS

| | | |
|---|---|---|
| 1,251,377 | Hull | Dec. 25, 1917 |
| 2,188,647 | Busse | Jan. 30, 1940 |
| 2,397,150 | Lyman | Mar. 26, 1946 |
| 2,474,255 | Kelly | June 28, 1949 |
| 2,513,225 | Wright | June 27, 1950 |
| 2,601,153 | Knight | June 17, 1952 |
| 2,621,309 | Faudell | Dec. 9, 1952 |
| 2,657,333 | Haantjes et al. | Oct. 27, 1953 |
| 2,712,092 | Schwartz | June 28, 1955 |
| 2,713,649 | Parker | July 19, 1955 |